Feb. 6, 1962     D. G. FAWKES     3,020,019
ROTARY VALVE
Filed Oct. 5, 1959     2 Sheets-Sheet 2
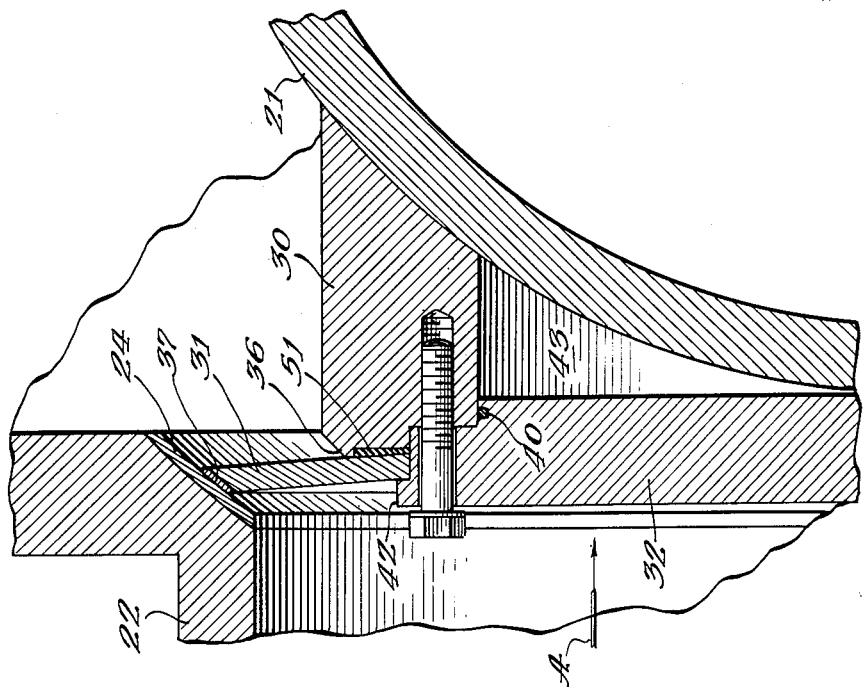
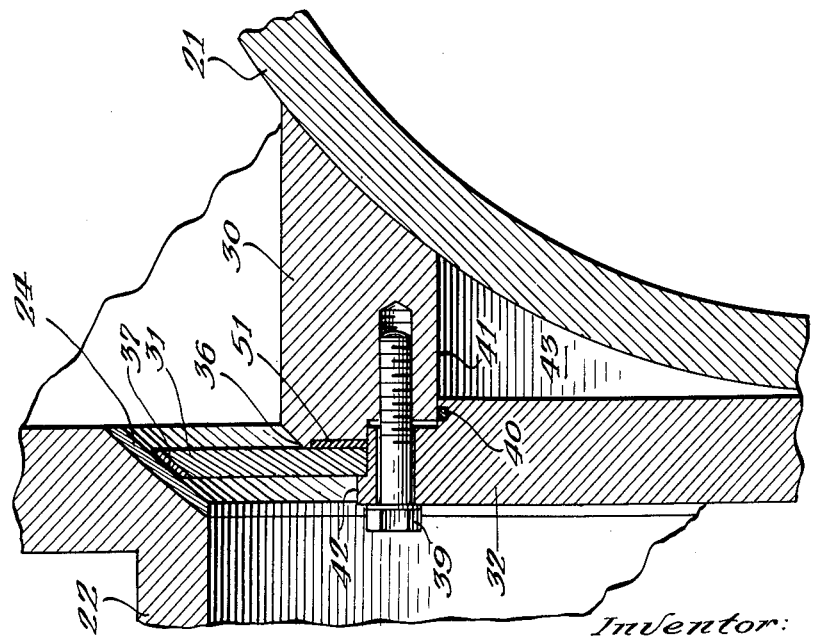
Inventor:
Donald C. Fawkes
By: Hofgren, Brady, Wegner,
Allen & Stellman
Attorneys

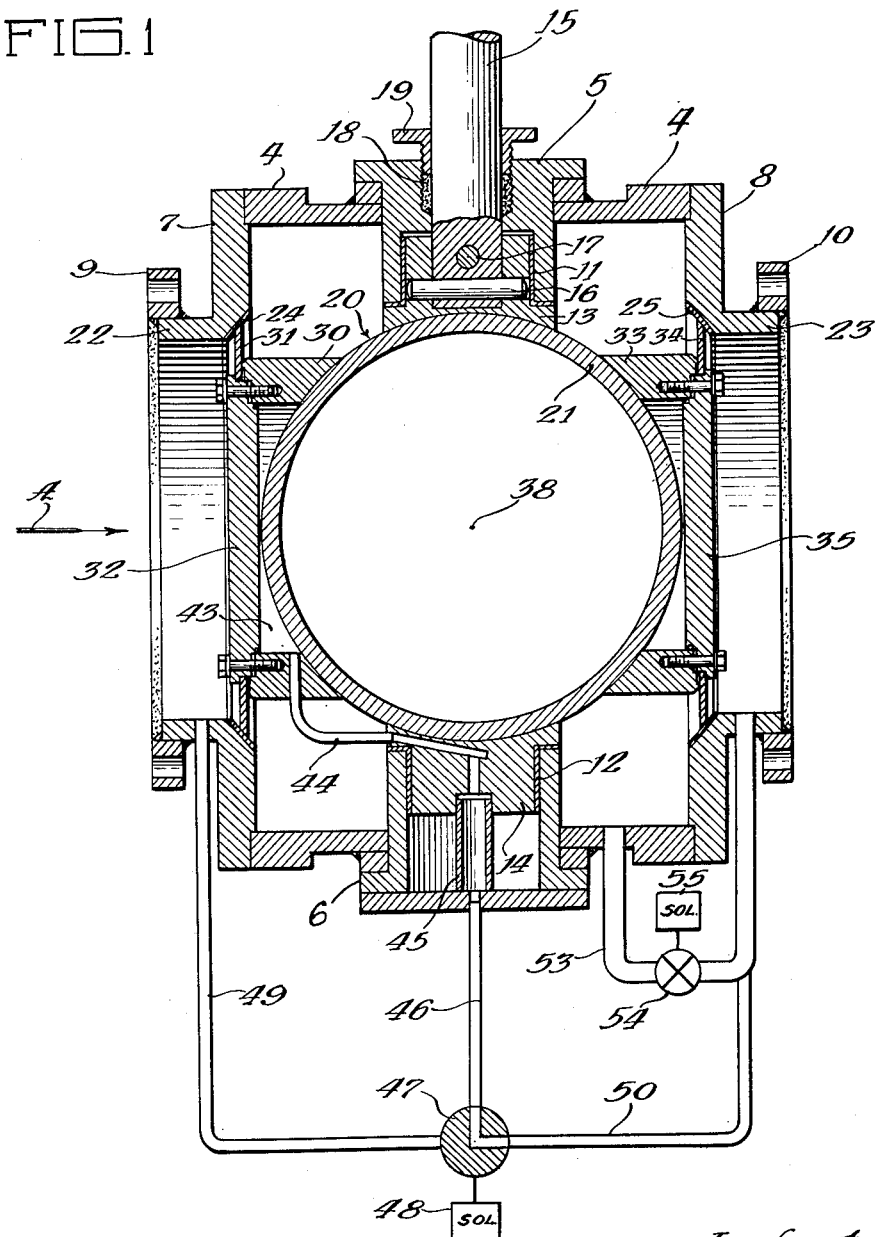

United States Patent Office 3,020,019
Patented Feb. 6, 1962

3,020,019
ROTARY VALVE
Donald G. Fawkes, Chicago, Ill., assignor to Henry Pratt Company, a corporation of Illinois
Filed Oct. 5, 1959, Ser. No. 844,291
11 Claims. (Cl. 251—175)

This invention relates to a rotary valve sometimes referred to as a ball or spherical valve, and more particularly to such a valve involving a closure including a flexible metal ring and a loading piston for flexing the ring into contact with a metal valve seat.

Rotary valves are generally made in larger sizes and have been quite expensive due to the difficulty in obtaining a tight closure. The valves are desirable from the standpoint that when open, there is no obstruction to flow and very little disturbance to the flow patterns through straight pipe. The rotor of the valve has a pipe-like section for alignment with the inlet and outlet of the valve providing a practically uninterrupted fluid flow. Generally, the rotor carries some sort of closure member intended to engage valve seats when the rotor is turned through 90°. The present invention provides as its primary object, a new and improved valve construction particularly relating to the closing of the valve.

An object of the invention is to provide a rotary valve closure mechanism operating under influence of fluid pressure in the connected lines for insuring tight sealing of the valve.

Another object is to provide a rotary valve which has closures with metal-to-metal sealing surfaces so constructed as to have a minimum of wear.

A further object is to provide a rotary valve in which the rotor may be mounted for rotation on a center line of the valve to promote ease of manufacture and having valve closures operable under particularly high pressures even though the rotor is centered.

Other objects, features and advantages of the invention will be apparent from the following description of a preferred embodiment illustrated in the accompanying drawings, in which:

FIGURE 1 is a vertical sectional view through the center of a valve embodying the invention showing diagrammatically connected pressure applying and relief passages and controls therefor;

FIGURE 2 is a fragmentary enlarged sectional view through a portion of a valve closure and associated valve seat showing the parts in the position occupied prior to the application of pressure to the valve closure; and FIGURE 3 is a view similar to FIGURE 2 showing the parts in the position occupied when pressure is applied to the closure to effect proper seating of the valve closure member.

The particular valve chosen for illustrating the principles of the invention is one constructed of fabricated metal parts which are welded together to form the housing of the valve. Rotary valves of the type to be described may be made in nominal sizes from 6 inches up to approximately 60 inches in diameter. The principles involved in the construction of the valves are the same regardless of the size although it will be understood that the type of bearings and the type of material employed in valves may vary with the size of the valve. Referring particularly to FIGURE 1, a valve housing is shown which has a cylindrical body portion 4 into which bearing housings 5 and 6 are secured. The main body of the housing respectively at its ends, receives flanged end portions 7 and 8 with the respective bolt flanges 9 and 10 by which the valve may be placed in and connected to adjoining piping. The bearing housings in the valve housing receive appropriate bearings 11 at the upper end and 12 at the lower end to receive the hubs 13 and 14 of a valve rotor. The upper hub 13 may have a valve operating shaft pinned thereto as by the pins 16 and 17 whereby the rotor may be turned generally through 90° between its open and closed positions. An appropriate packing 18 and stuffing box 19 may be provided about the operating shaft 15.

The housing for the valve whether of cast metal or fabricated steel is hollow and receives the rotor generally indicated 20 within the housing. The main part of the rotor is a pipe-like section 21 to which the hubs 13 and 14 are secured. The pipe section 21 is of an internal diameter substantially equal to the diameter of the pipe in which the valve will be placed and, therefore, also equal to the diameter of the portions 22 and 23 which support the bolted flanges 9 and 10. When the rotor is turned to align the pipe section 21 with the inlet and outlet of the valve, there will be a small gap between the ends of the pipe section and the valve body. This slight gap has very little effect upon the unobstructed and unrestricted flow of fluid through the valve housing.

In the form of the valve illustrated in the drawings, fluid flow is intended to pass in the direction of the arrow A, shown in FIGURE 1, so that the inlet is on the left-hand side through the portion 22 of the valve housing and the outlet is on the right-hand side of FIGURE 1. The inlet is formed with a valve seat 24 facing inwardly of the housing and formed around the portion 22 of the inlet. A similar valve seat 25 is formed in the portion 23 about the outlet for the valve. These valve seats are intended to receive the closure members on the valve rotor so that the valve may close against fluid flow therethrough. The present valve is intended to operate successfully in water pressures of 250 to 300 pounds per square inch, the valves themselves being tested at pressures up to 500 pounds per square inch.

The specific form of the valve closures on the inlet and outlet sides are made identical for economy in manufacture. Each closure involves a supporting ring 30, a ring plate 31 resting against the support 30, and a piston plate 32 secured to the ring support and bearing against the ring plate 31. In the case of the outlet closure, a similar support ring 33, ring plate 34 and piston plate 35 are employed, the parts being interchangeable.

The construction of these parts of the closure are best seen in FIGURES 2 and 3. The supporting ring is welded in liquid tight fashion to the side of the pipe-like member of the rotor. A circular nose 36 on the ring acts as a fulcrum for the relatively thin ring plate 31 which is annular in form and has an outer peripheral portion 37 shaped to mate with the valve seat 24. The mating surface between the ring plate and valve seat may be made spherical about the center 38 of the valve housing and rotor (FIGURE 1). The piston plate 32 is held on the ring support by a plurality of machine bolts 39 which hold the plate against outward movement by the head of the bolt but permits the plate to move toward the center of the rotor due to the lost motion provided. An O-ring 40 in the edge of the piston engages the inner surface 41 of the support ring to insure liquid or fluid tightness. The piston is also provided with an outwardly extending annular flange overlying and engaging the inner periphery of the ring plate 31. A space 43 between the piston plate, supporting ring and rotor is closed off from direct communication with fluid in the valve or connected piping.

Since the valve seats are of metal, either stainless steel or similar corrosion-resistant and long wearing material and the ring plate 31 is also of such material, it is important that there be little damaging contact between the surfaces during opening and closing of the valve. In order to insure proper operation, the space 43 behind the piston plate 32 on the upstream side of the valve may be connected to the inlet fluid pressure during valve closing operations. Referring to FIGURE 1, line 44 may be connected through the hub 14 to a nipple 45 in turn connected to line 46 controlled by a valve 47 which may, by the operation of a solenoid 48, connect the line either to branch 49 to the inlet side or to a branch 50 to the outlet side of the valve. After the pressure behind the piston plate 32 is equal to the inlet pressure, the ring plate may assume the position shown in FIGURE 2. The outer edge 37 of this plate preferably should have a slight clearance with the seat during rotor movement, although there may be very slight engagement with the valve seat 24, the engagement being so slight as to avoid damage to either surface. When it was desired to close the valve tightly, valve 47 would be shifted to exhaust space 43 beyond the piston plate 32 by connecting it to the outlet side of the valve. At this time the pressure upstream of the valve would cause the piston plate 32 to move toward the center of the rotor, as illustrated in FIGURE 3. The ring plate 31 would be tilted on its circular fulcrum 36 so that its outer edge 37 would be moved tightly against the valve seat 24. The upstream pressure thus tightens the closure in the inlet valve seat. A rubber gasket 51 generally is provided between the ring plate and support ring preventing undue leakage between the mating metal parts of the closure.

When the rotor was first closed without pressurizing the upstream closure member, the valve housing would be full of liquid. A certain amount of pressure would exist in the liquid in the housing. Since the downstream closure also has a relatively thin ring plate 34, the pressure within the housing would act thereon and tend to force the same into tight contact with the valve seat 25. During the time that the valve is closed, both upstream and downstream closures are thus forced tightly against their respective valve seats.

In opening the valve from the closed position, it is preferred to release the pressure on both valve closures. This may be done on the upstream side by introducing inlet fluid pressure through valve 47 to the space behind the piston plate 32. The pressure on the downstream closure may be released through an auxiliary line 53 controlled by a valve 54 therein and an operating solenoid 55, the line 53 extending from the interior of the housing to the outlet or, in other words, around the downstream closure member. Once the pressure is released on the closures, the rotor may be turned without damaging either the closures or the valve seats. Metal-to-metal valve seats may thus be operated many times without damaging the parts.

The foregoing detailed description has been given for clearness of understanding only and no unnecessary limitations are to be understood therefrom, for some modifications will be obvious to those skilled in the art.

I claim:

1. A rotary valve, comprising: a housing having spaced openings forming an inlet and an outlet; means forming a valve seat about said inlet; a rotor rotatably mounted in said housing and having a pipe-like member for alignment with said inlet and outlet to provide unobstructed fluid flow through the valve; a closure mounted on said rotor for extending across said inlet to close the valve, said closure including an annular ring plate annularly pivotally supported on said rotor, the ring plate outer periphery being shaped to sealingly engage said valve seat; and means responsive to fluid under pressure acting on said closure to pivot said ring plate on its support to bring said outer periphery into said sealing contact with the valve seat.

2. A rotary valve, comprising: a housing having spaced openings forming an inlet and an outlet; means forming a valve seat about said inlet; a rotor rotatably mounted in said housing and having a pipe-like member for alignment with said inlet and outlet to provide unobstructed fluid flow through the valve; and a closure mounted on said rotor for extending across said inlet to close the valve, said closure including a supporting ring on said rotor, an annular ring plate annularly pivotally supported on said supporting ring intermediate its inner and outer peripheries, said ring plate having an outer periphery shaped to sealing engage said valve seat, and means responsive to fluid under pressure acting on said closure to pivot said ring plate on said supporting ring to bring said outer periphery into said sealing contact with the valve seat closure.

3. A rotary valve, comprising: a housing having spaced openings forming an inlet and an outlet; means forming a valve seat about said inlet; a rotor rotatably mounted in said housing and having a pipe-like member for alignment with said inlet and outlet to provide unobstructed fluid flow through the valve; and a closure mounted on said rotor for extending across said inlet to close the valve, said closure including a circular supporting ring secured to the rotor, an annular ring plate bearing against said supporting ring along an annular fulcrum intermediate its inner and outer peripheries, said ring plate having its outer periphery shaped to sealingly engage said valve seat, and a piston plate extending across and secured to said circular supporting ring for limited movement toward and away from the center of the rotor, the outer periphery of the piston plate overlying the inner portion of the ring plate to tilt said ring plate on said fulcrum upon movement of the piston plate toward the center of the rotor under influence of fluid under pressure.

4. A rotary valve, comprising: a valve housing having a pair of opposite openings forming an inlet and an outlet for the housing; a rotor mounted in the housing for rotation through about 90° and having a pipe-like member for alignment with said openings to provide unobstructed flow through the valve; means forming a valve seat about each said housing opening; a pair of closure members, one on each side of said pipe-like member for closing said openings when the rotor is rotated to bring the closure across the openings, each closure including an annular ring plate annularly pivotally supported on the rotor intermediate its inner and outer peripheries and a piston plate secured to the rotor for limited movement relative to the rotor, each piston plate overlying the inner periphery of its respective ring plate so that the inlet closure ring plate may be pivoted into sealing contact with the inlet valve seat under influence of fluid under pressure in said inlet and the outlet ring plate may be pivoted into contact with the outlet valve seat by fluid under pressure within the valve housing.

5. A rotary valve, comprising: a valve housing having a pair of opposite openings forming an inlet and an outlet; means forming a valve seat about each opening facing inwardly of the housing; a rotor rotatably mounted in the housing and having a pipe-like member for alignment with said openings to provide unobstructed fluid flow through the valve; and a pair of closures, one on each side of the pipe-like member for respectively closing said inlet and outlet, each closure including a supporting ring on said closure and an annular ring plate annularly pivotally supported on said supporting ring with the ring plate having an outer periphery shaped to sealingly engage its respective valve seat, said inlet closure having means responsive to fluid under pressure acting on said closure to pivot its ring plate on its supporting ring to bring said outer periphery into said sealing contact with the valve seat about the inlet and said outlet closure ring plate being responsive to fluid under pressure within said valve housing to pivot on its support to bring its periphery into sealing contact with the valve seat about said outlet.

6. A rotary valve as specified in claim 5 wherein a piston plate is secured to said supporting ring of said inlet closure for limited bodily movement relative to the rotor, said rotor, supporting ring and piston plate forming a closed chamber, said piston plate having a periphery overlying and engaging the inner portion of said ring plate to pivot annularly said ring plate on the supporting ring under influence of fluid under pressure against the piston plate.

7. A rotary valve, comprising: a valve housing having spaced openings forming an inlet and an outlet; means forming a valve seat respectively about each opening; a rotor rotatably mounted in said housing and having a pipe-like member for alignment with said openings to provide unobstructed fluid flow through the valve; and a pair of similar closures, one on each side of said pipe-like member for seating respectively on said valve seats, each closure including a supporting ring secured to the rotor, an annular ring plate pivoted upon the support ring and having an outer periphery shaped to sealingly engage its respective valve seat and a piston plate mounted across the supporting ring for limited movement toward and away from the center of the rotor, the outer portion of said piston plate overlying the inner portion of said ring plate so that movement of the piston plate may annularly pivot the ring plate on said supporting ring, said inlet closure having a fluid tight chamber between its piston plate, supporting ring and pipe-like member; means for connecting said chamber selectively with the inlet and outlet of the valve so that said inlet ring plate may be pivotally forced into sealing contact with said inlet valve seat by pressure of fluid on the inlet closure plate when the valve is closed and pressure in said chamber may be equalized with inlet fluid pressure to relieve the force on said ring plate prior to opening the valve; said outlet ring plate being exposed to pressure of fluid within said housing when the valve is closed to pivotally force said ring plate into sealing engagement with said outlet valve seat; and means for venting said valve housing to the outlet to relieve fluid pressure within said valve housing prior to opening said valve.

8. A rotary valve, comprising: a housing having spaced openings forming an inlet and an outlet; means forming a valve seat about said inlet; a rotor rotatably mounted in said housing and having a pipe-like member for alignment with said openings to provide unobstructed fluid flow through the valve; a closure member mounted on said rotor for closing said inlet, said closure including an annular ring plate pivotally supported on said rotor, said ring plate having an outer periphery shaped to sealingly engage said valve seat and a piston plate across the closure mounted for limited movement on the rotor and in operative engagement with said ring plate to pivot annularly the latter when the piston plate is moved by pressure of fluid in said inlet, means forming a closed chamber between said piston plate and rotor; means for selectively connecting said chamber to said valve inlet and valve outlet whereby the ring plate may be positioned to contact the valve seat lightly during rotation of the rotor with inlet fluid pressure in said chamber and then forced into tight sealing contact with the valve seat upon connecting said chamber with the valve in closed position.

9. In a valve having a wall defining a fluid flow port provided with a circumjacent annular valve seat, structure for selectively closing the port, comprising: a rotor having an impervious portion; an annular fulcrum on said rotor circumjacent said portion having a diameter smaller than the maximum diameter of the valve seat; a resilient annular plate coaxially outwardly juxtaposed to said fulcrum, said plate being defined by an annular outer portion having a diameter larger than that of said fulcrum and juxtaposed to the valve seat when coaxially aligned therewith, an annular mid-portion, and an annular inner portion movable axially inwardly to pivot said mid-portion on the fulcrum and urge said outer portion axially outwardly into seating engagement with the valve seat; means sealing the plate to said rotor portion; and means for selectively moving said inner portion axially inwardly.

10. The valve structure of claim 9 wherein said sealing means comprises a resilient annular gasket concentrically radially inwardly of said fulcrum.

11. The valve structure of claim 9 wherein said closure ring comprises a thin annular plate formed of a resilient metal such as stainless steel.

References Cited in the file of this patent

UNITED STATES PATENTS

| | | |
|---|---|---|
| 2,809,011 | Davis | Oct. 8, 1957 |
| 2,857,130 | Brisbane | Oct. 21, 1958 |

FOREIGN PATENTS

| | | |
|---|---|---|
| 651,114 | Great Britain | Mar. 14, 1951 |